Sept. 18, 1934.  W. W. WARNER  1,974,322
CLUTCH
Filed Aug. 9, 1932
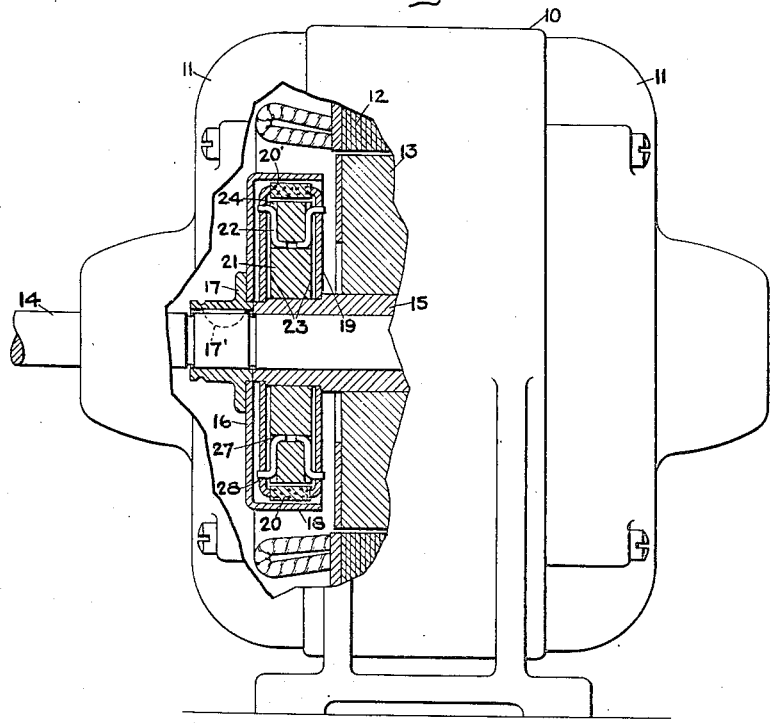
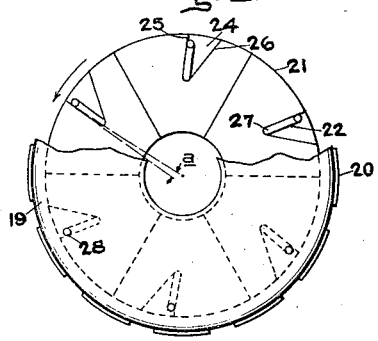
Inventor:
Wilbur W. Warner,
by Chas. E. Tullar
His Attorney.

Patented Sept. 18, 1934

1,974,322

UNITED STATES PATENT OFFICE 1,974,322

CLUTCH

Wilbur W. Warner, Fort Wayne, Ind., assignor to General Electric Company, a corporation of New York Application August 9, 1932, Serial No. 628,065

20 Claims. (Cl. 192—105)

My invention relates to centrifugally actuated clutches of the type in which the engagement of the driving and driven members of the clutch is delayed until the driving member has attained a predetermined speed.

It is desirable to provide a clutch of this type for connecting an electric motor to its load, as in this way high starting torque with low starting current can be obtained. Low starting current is obtained with a clutch of this type because the rotor of the motor is brought up to no load speed while disconnected from the load, and then the load can be suddenly connected to the motor to utilize the high kinetic energy of rotation of the rotor to start the load without increasing the starting current.

An object of my invention is to provide a centrifugal clutch of simple and compact construction.

Another object of my invention is to provide a centrifugal clutch in which the operation of the centrifugal members is governed by the balancing of the forces due to rotation and angular acceleration.

Further objects and advantages of my invention will become apparent as the following description proceeds and the features of novelty which characterize my invention will be pointed out with particularity in the claims annexed hereto and forming a part of this specification.

In the drawing, Fig. 1 is a side elevation of a motor having a centrifugal clutch embodying my invention arranged inside of the end shield thereof, and partly broken away more clearly to show the construction; Fig. 2 is a view of the centrifugal mechanism of the clutch partly broken away to show the centrifugal weight construction, and Fig. 3 shows one of the centrifugal weights of the clutch after it has moved outwardly under the action of centrifugal force, the position of this weight during the accelerating period of the clutch being shown in dotted lines.

Referring to the drawing, in Fig. 1, I have shown an electric motor having a centrifugal clutch embodying my invention. This motor includes a frame 10 having end-shields 11, a core structure 12, and a rotor 13 mounted on the shaft 14 of the motor, which is supported in bearings in the end-shields 11.

In accordance with my invention a clutch is provided for suddenly connecting the rotor 13 to the shaft 14 an interval after the rotor has attained full no-load speed to start the load without increasing the starting current. In the particular clutch construction illustrated, as an example of one manner of carrying out my invention, the clutch is arranged on the motor shaft inside of the end-shield 11 of the motor. This clutch includes a cup-shaped driven member 16 rigidly connected to a hub 17 which is keyed at 17' to the shaft 14. The centrifugal mechanism of the clutch includes a hollow driving member 19, which is rigidly connected to the sleeve 15, and which is arranged inside of an annular flange 18 of the driven member, and a plurality of segmental weights or outwardly movable members 21 pivotally mounted inside of the driving member and forming an annulus about the sleeve 15. The outer periphery of the driving member 19 is provided with a plurality of openings 20' in which are loosely arranged friction blocks 20 of cork composition, rubber or any other suitable material. These blocks are retained in the openings 20' between the weights 21 and the flange 18 of the driven member. The sleeve 15 is rigidly secured to the rotor 13 of the motor by providing a press fit between them, and the rotor and sleeve 15 are rotatably mounted on the shaft 14 of the motor, so that the rotor 13, the sleeve 15, and the centrifugal mechanism can rotate freely on the shaft 14 during the starting period of the motor and before the rotor has attained substantially full speed at which time the centrifugal device is actuated to establish a frictional driving connection between the driving and driven members of the clutch, so as to drive the shaft 14 to which the load is connected. The friction blocks 20 are urged by the weights 21 into frictional driving engagement with flange 18 of the driven member to establish a frictional driving connection between the driving and driven members of the clutch by the segmental weights 21 as will be hereinafter more fully described.

The centrifugal mechanism is directly driven by the rotor 13 which rotates in a counterclockwise direction viewed from the left end of the shaft 14 in Fig. 1, and as indicated by the arrow in Fig. 2. The plurality of segmental weights 21 are pivotally mounted inside of the driving member on cranks 22. The outer ends of these cranks are pivoted in the driving member at 28, and the inner ends of these cranks are pivoted in the weights at 27. The arms of the cranks 22 are arranged in V-shaped recesses 24, which are formed in the sides 23 of the weights 21, and the points of the V's are directed toward the axis of rotation of the weights. It will be apparent that the leading edges 25 and the trailing edges 26 of these recesses act as stops limiting the pivotal movement of the links 22 relative to the weights.

During the accelerating period of the motor the weights 21 are retained in a retracted position to form an annulus about the sleeve 15, in which position the weights loosely retain the friction blocks 20 in the openings 20'. In order to utilize the inertia of the weights to retain them in this retracted position during the accelerating period of the centrifugal device, the leading edges 25 of the V-shaped recesses 24 are arranged so that they are inclined from their outer edges to the bottom of the V's at a small angle $a$ in the direction of rotation of the centrifugal device, as shown in Fig. 2, so that the cranks 22 cannot assume a radial dead center position which would prevent the weights from moving outwardly under the action of centrifugal force. In the position of the weights shown in Fig. 2 the arms of the cranks 22 lie directly in contact with the leading edges 25, and the force required to accelerate the weights retains them in this position against the action of centrifugal force. It will be noted that centrifugal force produces only a small component tending to swing the weights 21 outwardly about the pivot points 28, as the arms of the cranks 22 are inclined only slightly with respect to the radius of the centrifugal device. When the centrifugal device is accelerated to substantially the full speed of the motor, or the full no-load speed of the motor, the force due to the angular acceleration of the centrifugal device which tends to retain the weights in the position shown in Fig. 2 is gradually reduced to zero. Centrifugal force is then effective to swing the weights about the pivots 28 on the driving member so that they move outwardly and suddenly engage the friction blocks 20 to form a frictional driving connection between the driving and driven members of the clutch. In moving outwardly in this way under the action of centrifugal force, the weights move from the retracted position shown in Fig. 2 to that shown in full lines in Fig. 3, the initial position of the weights with respect to the cranks being shown in dotted lines in Fig. 3. The trailing edges 26 of the recess 24 are arranged to limit the ultimate outward movement of the weights. In the present construction shown the weights first strike the friction block 20 and in case of excessive wear of these blocks, trailing edges 26 will be brought into play to limit the movement of the mechanism. In this way the kinetic energy of the rotor and centrifugal device at substantially full motor speed is utilized to produce high starting torque with low starting current for the motor. The operating characteristics of the centrifugal mechanism are determined by the selection of the relative dimensions of the links 22 and the angle "$a$". When the accelerating characteristics of the driving means and the speed at which it is desired to operate the centrifugal mechanism are known the angle $a$ and the length of links 22 is so chosen that the centrifugal force will overcome the force of acceleration when the desired speed is reached. In the illustrated embodiment of my invention angle $a$ is quite small, being less than two degrees. This arrangement prevents, or restrains the outward movement of the weights 21 until the motor has attained substantially full no-load speed.

Although the foregoing described centrifugal mechanism is embodied in an electric motor clutch, it is apparent that it is of general application and may be employed in any device in which the operating characteristics of this mechanism are desirable.

In operation when the driving member is started the links 22 will be forced against the advancing edges 25 regardless of the position of the weights before starting. Thus it is apparent that no retaining spring or other such device is required to hold the weights in position or to counteract the centrifugal force, because the automatic action of the mechanism forces the weights into retracted position immediately on starting. It is to be noted that the weights are positively connected to the driving member and that they are thus brought up to speed with the driving member and hence the full effect of centrifugal force at the speed of the driving member is available for operation. At a predetermined speed the component of centrifugal force tending to rotate the links 22 about the pivots 28 will overcome the force of acceleration which opposes this rotation and the weights will move outward and press the friction blocks 20 against the flange 18 of the driven member 16 to establish a frictional driving connection between the driven and driving members. The component of centrifugal force turning the weights about pivots 28 is resisted throughout this movement by the force of acceleration. This component, however, increases as the square of the radius of rotation of the weights and at the same time its effective lever arm about pivot point 28 is increased, so that the weights move outward quickly to suddenly engage the driving and driven members and produce a high starting torque on the driven member and the load connected thereto.

Although I have shown my invention as applied to an electric motor, it will be apparent that it is applicable to any device in which a delayed action is desired. I do not, therefore, desire my invention to be limited to the arrangement shown and described and I intend in the appended claims to cover all modifications thereof which do not depart from the spirit and scope of my invention.

What I claim as new and desire to secure by Letters Patent of the United States, is,—

1. A clutch including a driving member and a driven member, an outwardly movable weight rotatable with said driving member, means utilizing the outward movement of said weight for connecting said members, and means including a link pivoted to said driving member and to said weight and utilizing the force produced by the angular acceleration of said weight for preventing the outward movement of said weight to connect said members until said driving member has attained a predetermined speed.

2. A clutch including a driving member and a driven member cooperating to form a casing, an outwardly movable weight rotatable with said driving member and arranged in said casing, means utilizing the outward movement of said weight for connecting said members, and means including a link pivoted to said driving member and to said weight and utilizing the force produced by the angular acceleration of said weight for preventing the outward movement of said weight to connect said members until said driving member has attained a predetermined speed.

3. A clutch including a driving member and a driven member, a weight rotatable with said driving member and movable outward from the axis thereof, means utilizing the outward movement of said weight for connecting said members, and means including a link pivoted to said driving member and to said weight and utilizing the force produced by the angular acceleration of said weight for preventing the outward movement of said weight to connect said members until said driving member has attained a predetermined speed.

4. A clutch including a driving member and a driven member, an outwardly movable weight rotatable with said driving member, means utilizing the outward movement of said weight for connecting said members, and means including a connection link pivoted to said weight and to said driving member and utilizing the force produced by the angular acceleration of said weight for preventing the outward movement of said weight to connect said members until said driving member has attained a predetermined speed.

5. A clutch including a driving member and a driven member, an outwardly movable member rotatable with said driving member, means utilizing the outward movement of said outwardly movable member for connecting said members, a link pivotally connected to said outwardly movable member and to said driving member, and means including stops on one of said members cooperating with said link for utilizing the inertia of said outwardly movable member for preventing the outward movement of said outwardly movable member to connect said members until said driving member has attained a predetermined speed.

6. A clutch including a driving member and a driven member, an outwardly movable member rotatable with said driving member, a link pivotally connected to said driving member and to said outwardly movable member, means including stops on one of said members limiting the movement of said link with respect to said outwardly movable member and utilizing the inertia of said outwardly movable member for preventing outward movement thereof until said driving member has attained a predetermined speed, and means utilizing the outward movement of said outwardly movable member for connecting said members.

7. A clutch including a driving member and a driven member, said driving member having an opening therein, a friction block arranged in said opening, an outwardly movable weight rotatable with said driving member and arranged to urge said block against said driven member for connecting said members, and means utilizing the force produced by the angular acceleration of said weight for preventing the outward movement of said weight to connect said members until said driving member has attained a predetermined speed.

8. A clutch including a driving member and a driven member, a rotatable annulus of outwardly movable segmental weights, means utilizing the outward movement of said weights for connecting said members, and means including links pivoted to said weights and to said driving member and utilizing the force produced by the angular acceleration of said weights for preventing outward movement of said weights to connect said members until said driving member has attained a predetermined speed.

9. A clutch including a driving member and a driven member, said driving member having openings therein, friction blocks in said openings, a rotatable annulus of outwardly movable segmental weights arranged to urge said blocks against said driven member for connecting said members, and means including a positive driving connection between said weights and said driving member and utilizing the inertia of said weights for preventing the outward movement of said weights to connect said members until said driving member has attained a predetermined speed.

10. A clutch including a hollow driving member and a driven member, said driving member having openings in the periphery thereof, friction blocks arranged in said openings, a rotatable annulus of outwardly movable segmental weights arranged within said driving member and arranged to urge said blocks against said driven member for connecting said members, and means including a positive driving connection between said weights and said driving member and utilizing the inertia of said weights for preventing the outward movement of said weights to connect said members until said driving member has attained a predetermined speed.

11. A clutch including a driving member and a driven member, means for connecting said members, a rotatable annulus of outwardly movable segmental weights arranged within said driving member and arranged to actuate said means for connecting said members, links pivotally connecting said weights to said driving member, and means including stops on said weights cooperating with said links and utilizing the inertia of said weights for preventing the outward movement of said weights to connect said members until said driving member has attained a predetermined speed.

12. A clutch including a driving member and a driven member, an outwardly movable centrifugal weight rotatable with said driving member, means utilizing the outward movement of said weight for connecting said members, said weight having a recess therein, and means including a positive driving connection between said weight and said driving member and cooperating with the recess in said weight for utilizing the inertia of said weight for restraining the outward movement of said weight to connect said members until said driving member has attained a predetermined speed.

13. A centrifugal mechanism including an outwardly movable centrifugally actuated weight, and means including a link pivoted to said weight and utilizing the force produced by the angular acceleration of said weight for restraining its outward movement.

14. A centrifugal mechanism including an outwardly movable centrifugally actuated weight, and means including a link pivoted to said weight and utilizing the resultant of the forces produced by said weight due to its rotation and angular acceleration for restraining outward movement of said weight.

15. A centrifugal mechanism including a centrifugally actuated weight movable from a retracted to an outward position, and means including a link pivoted to said weight and utilizing the force produced by the angular acceleration of said weight and responsive to the initial angular acceleration of said weight for moving said weight to the retracted position thereof and for utilizing the force produced by the angular acceleration of said weight to retain the same in said retracted position until it has attained a predetermined speed.

16. A centrifugal mechanism including an outwardly movable centrifugally actuated member, a driving member for said centrifugally actuated member, a link pivoted to said centrifugally actuated member and to said driving member, and means including stops on one of said members and utilizing the force produced by the angular acceleration of said centrifugally actuated member for preventing outward movement thereof until said driving member has attained a predetermined speed.

17. A centrifugal mechanism including an outwardly movable centrifugally actuated weight, a driving member enclosing said weight, and means including a positive driving connection between said weight and said driving member and utilizing the inertia of said weight for restraining the outward movement thereof until said driving member has attained a predetermined speed.

18. A centrifugal mechanism including a hollow driving member and a rotatable annulus of outwardly movable segmental weights arranged therein, and means connecting said weights and said driving member, said means utilizing the force produced by the angular acceleration of said weights for preventing outward movement of said weights until said driving member has attained a predetermined speed.

19. A centrifugal mechanism including a driving member, a centrifugally actuated weight movable from a retracted to an outward position, means including a link for utilizing the force produced by angular acceleration of said weight for restraining outward movement thereof until said driving member has attained a predetermined speed, said link being pivoted to said weight and to said driving member, said weight when in its retracted position having its center of gravity nearer the axis of rotation of said driving member than the pivotal connection of said link to said member, the center of gravity of said weight also being located angularly in advance of said last named pivotal connection in the direction of rotation thereof.

20. A centrifugal mechanism including a rotatable shaft, an annulus of centrifugally actuated weights arranged about said shaft, said weights being movable outwardly from a retracted position, plates secured to said shaft on either side of said annulus, links pivotally connecting said plates to said weights, and means including stops on said weights cooperating with said links to utilize the inertia of said weights for restraining the outward movement thereof until the rate of acceleration of said shaft has decreased to a predetermined value.

WILBUR W. WARNER.